March 24, 1931.  H. H. HASTINGS  1,797,685
ANIMAL TRAP
Filed Dec. 11, 1928  2 Sheets-Sheet 1
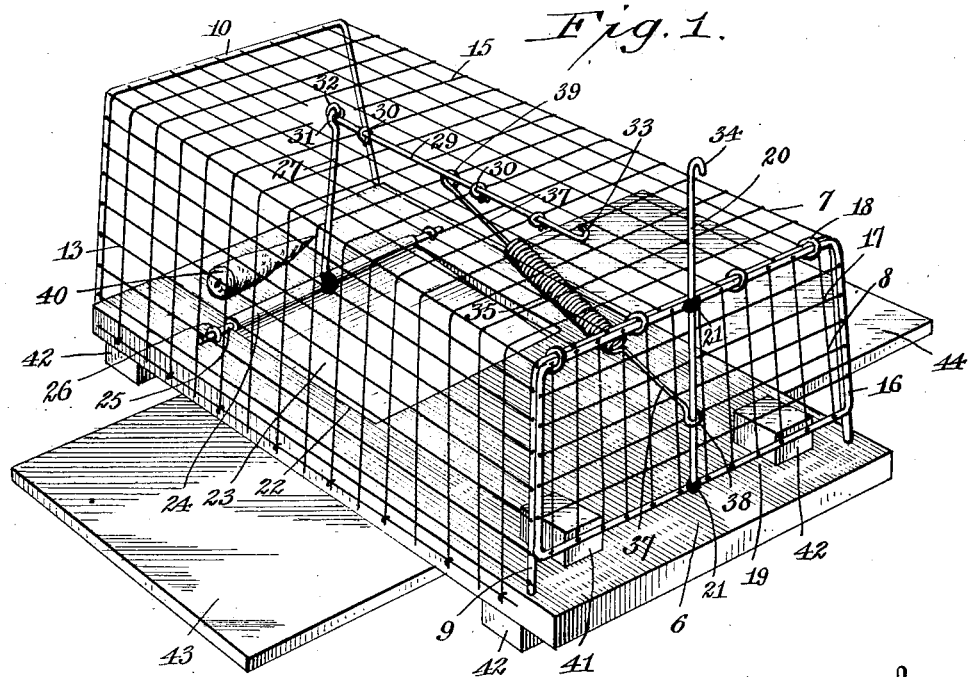
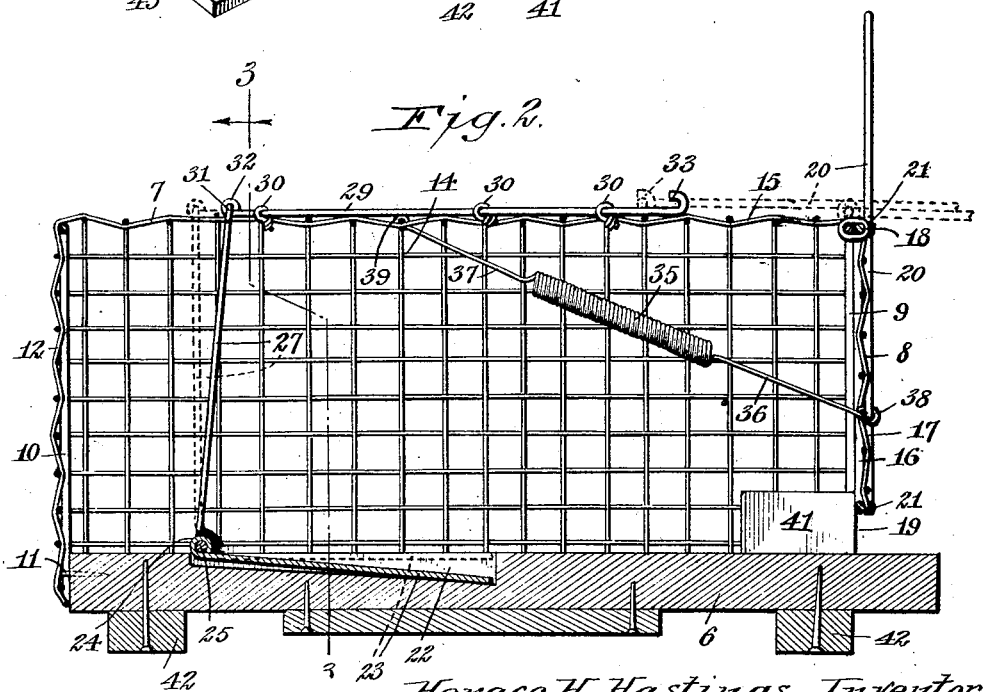
Horace H. Hastings, Inventor.
By Emil Kuhlarl
Attorney.

March 24, 1931. H. H. HASTINGS 1,797,685
ANIMAL TRAP
Filed Dec. 11, 1928 2 Sheets-Sheet 2
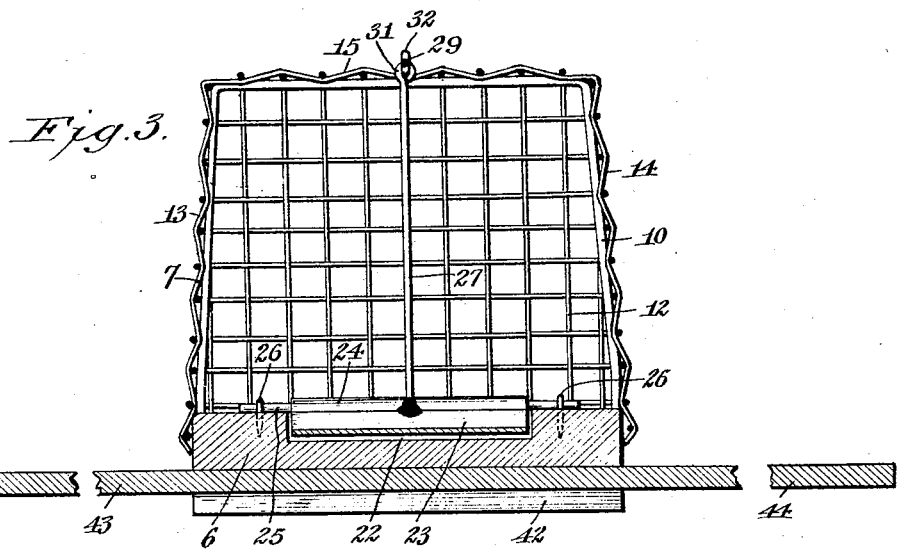
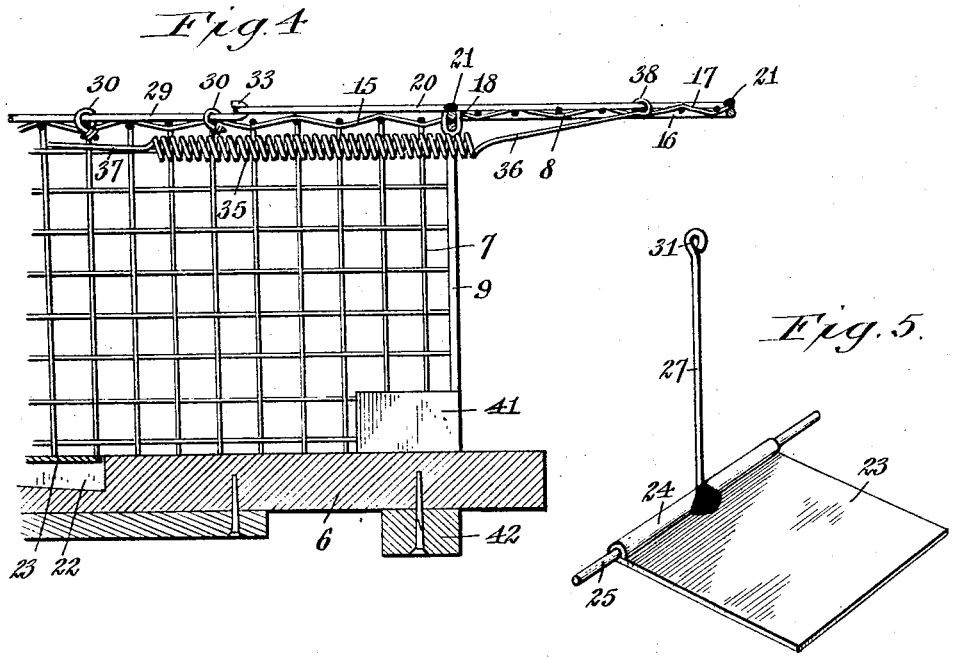
Horace H. Hastings, Inventor.
By Emil Neuhart,
Attorney.

Patented Mar. 24, 1931

1,797,685

UNITED STATES PATENT OFFICE

HORACE H. HASTINGS, OF BUFFALO, NEW YORK

ANIMAL TRAP

Application filed December 11, 1928. Serial No. 325,319.

This invention relates to improvements in animal traps, and more particularly to one adapted for trapping of muskrats and similar types of animals.

The object of my invention is the production of a trap with which the possibility of injuring the animal during the act of trapping the same is eliminated, and which is so constructed that the bait used to entice the animal is so disposed with reference to the tripping and trapping elements of the trap that the animal, in attempting to reach the bait, will actuate the tripping mechanism without possibility of escaping from the enclosure before the trapping mechanism is actuated.

A further object of my invention is the production of a trap so constructed that the body of the animal will be fully within the trap housing when the trap gate is released, the trap gate being so constructed and related with reference to the base of the trap that even though the tail of the animal may extend out of the housing, it will not be injured by the sudden closing of the trap gate; this being a decided advantage in trapping muskrats, due to the fact that many of them only slightly injured become diseased and die, and consequently a trap which will subject the animal to injury makes it impossible to use the trapped animal for breeding purposes, this trap being particularly adapted for that purpose.

A further object of my invention is the provision of a trap with new and novel tripping mechanism, which is also sensitive to touch, quick acting, and releasable from the trapping mechanism to cause the last-named mechanism to function quickly and fully enclose the animal without opportunity of its escaping.

A further object of my invention is the production of a buoyant trap capable of being sustained on a stream or other body of water when suitably anchored, and in which provision is made to prevent the trap being upset when the body of water on which it is buoyantly held becomes rough, thus avoiding drowning of the muskrat when trapped.

With the above and other objects in view to appear hereinafter, the invention consists in the novel features of construction and in the arrangement and combination of parts to be hereinafter described, and more particularly pointed out in the subjoined claims.

In the drawings:—

Fig. 1 is a perspective view of a trap embodying my invention.

Fig. 2 is a central longitudinal section of the same, with the trapping mechanism, or more particularly the trap gate, in its released or tripped position to close the entrance opening of the housing or enclosure.

Fig. 3 is a transverse section taken on line 3—3, Fig. 2, looking in the direction of the arrow crossing said line.

Fig. 4 is a view of the front end of the trap similar to Fig. 2, but having the trapping mechanism or trap gate in open position, and so retained by a portion of the tripping mechanism.

Fig. 5 is a perspective view of the trip plate and the actuating or trip lever projecting therefrom.

In the drawings, like numerals of reference refer to like parts of the several figures.

The reference numeral 6 designates a base or bottom for the enclosure or housing, which is formed of wood or other buoyant material, and on this base or bottom a reticulated housing or enclosure 7 is mounted, which includes a trap gate 8, to be more specifically referred to hereinafter.

The housing or enclosure comprises two frame members 9 and 10 at the front and rear, respectively, which are formed of comparatively stiff wire. To the rear frame member, which is fastened at its lower end to the rear edge of the base or bottom by staples 11, a wire mesh wall 12 is secured, the wire mesh being cut to the form of the frame member and having the ends of the wires forming the same, soldered or otherwise secured to the frame member. The side walls 13, 14 and the top wall 15 are formed out of one piece of wire mesh and bent to conform to the frame members 9 and 10. The lower ends of the side walls are stapled or otherwise fastened to the side edges of the base or bottom 6 and the wires at the front and rear ends of both side walls and the top wall are soldered or otherwise fastened to the frame members 9 and 10; thus the housing or enclosure is formed with an open front end, closed by the trap gate 8, which may be said to form part of the housing or enclosure. This trap gate comprises a frame 16 formed of comparatively stiff wire and wire mesh 17 cut to the shape of the frame 16 and having the ends of the wires forming the mesh material soldered or otherwise fastened to said frame.

The upper edge of this trap gate is pivotally secured to the upper stretch of wire forming part of the front frame member 9 by means of wire eyes 18, or otherwise, said eyes surrounding said upper stretch of wire and the upper stretch of the wire frame of the gate. This trap gate is diminished in height to form an elongated space or opening 19 between the lower end thereof and the base or bottom 6, as best shown in Fig. 2.

Fastened to the trap gate 8 is a retainer bar 20 which is disposed at a point centrally between the ends of the gate and extends upwardly a distance above the upper edge thereof; it being soldered or otherwise secured to the upper and lower stretches of the gate frame, as at 21.

The upper face of the base or bottom 6 is provided at a suitable distance in rear of the trap gate, or the front open end of the housing or enclosure when the gate is opened, with a comparatively long and wide depression 22 in which is disposed a trip plate 23, the dimensions of which are slightly less than those of the depression so that the plate will fit freely within said depression and be movable therein. This trip plate is pivotally attached at its rear end, and for this purpose I preferably curve the rear marginal portion of the plate, as at 24, around a wire rod 25, which is disposed transversely over the rear end of the depression and projects beyond the side walls of the latter so as to lie against the upper surface of the bottom or base. Over these projecting ends, staples 26 are passed which are driven into the base or bottom and hold the trip plate pivotally in position.

As clearly shown in Fig. 2, this trip plate is positioned to incline forwardly and have its front end supported by the bottom of the depression 22 at the front end thereof, this being the position of the plate when the trap gate is closed.

Rising from the rear pivoted end of the plate is an actuating or trip lever 27, which is in the form of a stiff wire soldered or otherwise fastened to the rear pivoted end of the trip plate. While I have shown the lower end of this wire bent to conform to the curvature of the plate where curved or looped around the pivot wire or rod 25, this trip lever may be otherwise attached to the trip plate or be formed integral with the pivot wire or rod. Said trip lever is therefore arranged for swinging movement upon actuation of said trip plate.

Mounted on top of the enclosure or housing is a trip rod 29 which is slidable in eyes 30 fastened to one or more of the wires of the wire mesh forming the top wall of the housing or enclosure, and this trip rod is connected to the upper end of the trip lever 27 in any suitable manner so as to cause it to be slid forward and back upon swinging movement of said trip lever. This connection between the trip lever and the trip rod I form by providing them with interlinked eyes, the upper end of the trip lever having an eye 31 and the rear end of the trip rod having an eye 32 at right angles to the eye 31, and looped therethrough. The front end of said trip rod is provided with an upwardly and rearwardly curved terminal, forming a hook 33 which is at right angles to a hook 34 at the upper end of the retainer rod 20 and which hook 34 is adapted for connection with the hook 33 of said trip rod.

The trap gate is held normally closed by a spiral spring 35, the ends of which are extended in straight lines, as at 36, 37. The front end of the front extension 36 is bent into the form of a loop 38 fastened to the wire mesh of the trap gate, or to the retainer bar at a convenient point where it overlies the wire mesh of said gate, while the rear end of the extension 37 is provided with a loop 39 connected to one or more of the wires forming the top wall of the housing or enclosure.

As illustrated in Fig. 2 of the drawings, the spring 35 is under slight tension, and holds the trap gate against the wire frame 9 at the front end of the main portion of the housing or enclosure. The trip plate is in lowered position within the depression 22 formed in the base or bottom of the trap, causing the trip lever 27 to lean forwardly and the trip rod 29 to be moved into its foremost position; the retainer bar of the trap gate extending upwardly in a vertical position beyond the top of the housing or enclosure.

When setting the trap, bait, such as a carrot or other food, is placed on the base or bottom of the trap between the pivoted end of the trip plate 23 and the rear wall of the housing or enclosure, as indicated at 40, Fig. 1. The trip rod 29 is then taken hold of and moved rearwardly, with the result that, through the medium of the trip lever 27, the trip plate 23 is swung upwardly on its pivot 25 so that the upper surface of this plate is slightly above the upper surface of the base or bottom. Preparatory to so moving the trip rod 29, the trap gate 8 is swung into horizontal position, as shown in Fig. 4 and with dotted lines in Fig. 2, with the result that the upper end of the retainer rod 20 extends over the top of the housing or enclosure and the hook of said retainer rod is swung downwardly against said trip rod in rear of the terminal of the hook 33 formed thereon. The trip rod is then moved rearwardly to a slight degree so that the bight of the hook 34 on said retainer rod is positioned against the bight of the hook 33 on said trip rod; or expressed in other words, so that the bight of the hook 34 on said retainer rod is underneath the rearwardly-extending terminal of the hook 33 on said trip rod. At such times, the upper surface of the trip plate will be flush with the upper surface of the base or bottom and be so retained by the interlocking hooks formed, respectively, on the retainer rod and the trip rod. The trap so arranged provides free access to the interior of the housing or enclosure, and as the animal enters with a view of reaching the bait at the rear end thereof, it will step upon the trip plate, causing it to be depressed. This results in the trip lever 27 being swung forwardly and causes the trip rod 29 to be moved forwardly. Under this action the hook 34 of the retainer rod is released from the hook 33 of the trip rod and the spring 35 is brought into immediate action, causing a quick closing of the trap gate 8 and resulting in the animal being housed within the trap without possibility of escape.

Due to the fact that this trap is intended to be floated on a body of water, it is found of advantage to make it comparatively light in weight, and therefore the weight of the buoyant base or bottom is not added to beyond what is necessary to provide a light-weight housing or enclosure and tripping and trapping mechanism possessing sufficient strength to avoid escape of the animal after being trapped. For this reason, the frame wires of the housing, including the trap gate thereof, are of sufficient size to give the housing and gate proper form and retain such form under reasonable usage, without undue weight. Due to this and the quick closing of the gate under the tension of the spring 35, inward flexing of the lower stretch of wire forming the gate frame may occur, and to avoid this, I have provided on the base or bottom, stop lugs 41, the front ends of which are alined with the front side of the wire frame 9, with the result that the gate bears against both this frame and against the stop lugs when in closed position.

In the event that an animal is trapped and its tail is not fully within the enclosure or housing, the gate will cause the tail to be pushed inwardly and downwardly, or at least downwardly, so that it may extend out through the transversely elongated space or opening 19 between the lower end of the trap gate and the base or bottom.

When the base or bottom is made of wood, I secure to the under side thereof cleats 42 to prevent warping thereof, these cleats terminating at the side edges of the base or bottom.

To prevent upsetting of the trap when floated on a body of water, I provide stabilizing wings 43, 44, in the form of a strip of wood or other suitable material fastened to the under side of the base or bottom and extending a considerable distance beyond the side edges thereof; these stabilizing wings having considerable superficial area so that when the trap is anchored upon a body of water and an animal is trapped therein, the trap will not only float, but will be prevented from being turned over when the water becomes rough, thus avoiding the submerging of the animal, which would not be able to sustain life under water for any considerable length of time.

Having thus described my invention, what I claim is:—

1. An animal trap, comprising a base, a housing mounted on and secured to the edges of said base and having a rear wall, opposite side walls, a top wall and an entrance opening at its front, a trap gate pivotally secured to the front end of said top wall and having a retainer arm extending upwardly therefrom provided with a hook at its upper end, a coil spring connected at its rear end to said top wall and at its front end to said trap gate, a trip plate pivotally secured at its rear end to said base, a trip lever rigidly secured to the rear pivoted end of said trip plate and extending upwardly through the top wall of said housing, and a trip rod slidably mounted on said top wall and having connection at its rear end with the upper end of said trip lever, the front end of said trip rod having a hook adapted for co-action with the hook on said retainer arm.

2. An animal trap, comprising a base having a comparatively wide and long depression in its upper surface, a reticulated enclosure mounted on and secured to said base and comprising a rear wall spaced from the rear end of said depression to provide a bait-depositing region on said base, opposite side walls, and a top wall, said enclosure having an entrance opening at its front end, a trap gate hinged to the front end of said top wall and having a retainer arm extending upwardly therefrom and adapted to extend over said top wall when said trap gate is moved into open horizontal position, a trip plate fitted into said depression and having its rear end pivotally secured to said base, a trip lever rigidly secured to the rear pivoted end of said trip plate and extending upwardly through said top wall so as to swing under movement of said trip plate, a longitudinally-movable trip rod mounted on said top wall and having connection with the upper end of said trip lever, said trip rod having releasable connection with the retainer arm of said trap gate and being released therefrom upon depressing said trip plate within said depression, and a spring for closing said trap gate when said retainer arm is released from said trip rod.

In testimony whereof, I affix my signature.

HORACE H. HASTINGS.